Patented Sept. 1, 1953

2,650,921

UNITED STATES PATENT OFFICE 2,650,921

2-KETO PYRIMIDINES

James M. Sprague, Drexel Hill, and Everett M. Schultz, Glenolden, Pa., assignors to Merck & Co., Inc., a corporation of New Jersey No Drawing. Application March 23, 1948, Serial No. 16,614

9 Claims. (Cl. 260—251)

This invention is concerned with 2-oxo-6-carbonyloxy-pyrimidines having linked to the carbon in the 4-position an alkyl, aralkyl, or aryl substitutent, and which are either unsubstituted on the 5-carbon or have linked to the 5-carbon an alkyl or aralkyl, or aryl radical, or one end of a divalent aliphatic hydrocarbon radical, the other end of which is linked to the carbon in the 4-position. The invention also concerns the method of preparing these pyrimidines by condensing urea under acid conditions, by the use of a mineral acid, with a 1,3-diketo carboxylic acid ester having its carboxylate group linked to the carbon of one of the keto groups and having linked to the carbon of the second keto group the hydrocarbon radical which is to be linked to the carbon atom in the 4-position of the pyrimidine compound to be prepared, or having linked jointly to both the carbons of said second keto group and the carbon between the keto groups the divalent aliphatic hydrocarbon radical which it is desired to have linked jointly to the carbons in the 4- and 5-positions of the end pyrimidine. The method of the invention also includes the de-esterification of the carboxylate group of the diketo ester simultaneously with its condensation with the urea.

In this specification and the accompanying claims the term "carbonyloxy" covers generically the free carboxyl group (—COOH) and the carboxylate group (—COOR wherein R is an alkyl or aralkyl radical or a monovalent alkali anion such as the ammonium group or an alkali metal).

Thus, among the compounds of the invention there are three types of substituted pyrimidines, namely, (a) the dihydro-pyrimidines having the dihydro-saturation between one of the nitrogens and the carbon between them, and with the free carboxyl group in the 6-position; (b) the hexahydro or fully hydrogenated pyrimidines (namely, those having no double bonds) with the free carboxyl group in the 6-position; and (c) those which differ only from type (b) by having in the 6-position a carboxylate group, either as carbalkoxy or carbaralkoxy or ammonium or alkali metal carboxylate.

Accordingly, in addition to covering the fundamental step of the condensation of urea under acid conditions with the particularly described 1,3-diketo ester, the method of the invention includes also the hydrogenation, preferably by catalytic hydrogenation, of the type (a) substituted pyrimidines to the corresponding fully hydrogenated substituted pyrimidines of type (b) and subsequently the esterification of the type (b) substituted pyrimidines with the selected alcohol to give the corresponding substituted pyrimidines of the type (c) containing the carboxylate substituent on the 6-carbon (as well as the neutralization of the free carboxyl group to give the ammonium or an alkali metal carboxylate).

The products of the invention are generically more particularly described as 2-oxo-4-$R_1$-5-$R_2$-6-carbonyloxy-pyrimidines, in which the pyrimidine ring is at least partially hydrogenated and selected from the class consisting of (a) the dihydro-pyrimidine which has the dihydro saturation only between one of the nitrogens and the carbon atom located between them (so that the pyrimidine ring still has two double bonds), and (b) the fully saturated hexahydro-pyrimidine, wherein the carbonyloxy group is either the free carboxyl group or a carboxylate group such as a carbalkoxy or carbaralkoxy group or the ammonium or an alkali metal carboxylate and in which $R_1$ is mono-alkyl or -aralkyl or -aryl when $R_2$ is hydrogen, or both $R_1$ and $R_2$ are the same or different mono-alkyl, -aralkyl, or -aryl group; or $R_1$ and $R_2$ jointly make a divalent polymethylene group such as the tetramethylene group.

The compounds of the invention and the methods by which they are obtained are illustrated by, but not confined to, the following examples:

*Example 1.—2-oxo-4-isopropyl-2,3-dihydro-6-carboxyl-pyrimidine:* 64 grams (1.07 mole) of urea were dissolved in 390 grams (1.07 mole) of ten per cent hydrochloric acid in a round bottom, three-necked flask equipped with a stirrer and upright condenser. 200 grams (1.07 mole) of ethyl isobutyryl-pyruvate were added to the solution, on which it formed an oily layer. Then 600 cc. of ethanol were added to produce a homogeneous solution which was then boiled gently for 20 hours during which the solution turned to a clear red color. After standing at room temperature, a yellow, amorphous powder deposited from the solution. This precipitate was then collected by filtration on a Buchner funnel and washed with a little water and then with acetone and dried by suction. The yield was 90 grams of 2-oxo-4-isopropyl-2,3-dihydro-6-carboxyl-pyrimidine melting at 191° C. (with decomposition).

This product dissolved in water upon the dropwise addition of, and shaking with, sodium bicarbonate solution, with evolution of carbon dioxide. Continued addition of the bicarbonate solution or acidification caused this end product to precipitate. The product is only slightly soluble in hot or cold water; soluble in hot concentrated hydrochloric acid but insoluble in hot ten per cent hydrochloric acid; soluble in ten per cent methanol, but does not separate on cooling; soluble in ten per cent sodium hydroxide and in ammonium hydroxide, and addition of acids precipitates the original compound from each of these hydroxide solutions.

While recrystallization was somewhat difficult in view of these solubility properties, good crystals were obtained by suspending 1.3 grams of the end product in 30 cc. of pure, hot ethanol and bringing the compound into solution by addition of a few drops of ten per cent hydrochloric acid. On cooling there separated a yellow solid melting at 193–195° C. (with decomposition).

In place of the ethyl isobutyrylpyruvate of this Example 1, an alkyl ester of any other alkanoylpyruvate can be used in equimolecular proportions in the method of the example, for example, ethyl propionylpyruvate to give the corresponding pyrimidine with an ethyl group in the 4-position instead of the isopropyl group of the compound of Example 1; or ethyl butyrylpyruvate to give the corresponding derivative having the normal propyl group in the 4-position instead of the isopropyl group of the compound of Example 1; or an ester of benzoylpyruvate to give the corresponding compound having an aryl group in the 4-position, specifically in this case, the phenyl radical in the 4-position replacing the 4-isopropyl group of the compound of Example 1.

*Example 2.—2-oxo-2,3-dihydro-4,5-tetramethylene-6-carboxyl-pyrimidine*: 160 grams (2.66 moles) of urea were dissolved in 650 cc. of 10 percent hydrochloric acid in a three-necked flask equipped as in Example 1 and 400 grams (2.06 moles) of ethyl 2-ketocyclohexylglyoxalate were added with stirring. While the colorless, heterogeneous mixture was rapidly stirred and heated over a steam-bath, it changed to light green, dark green, olive, and finally to olive-brown. At the end of two hours of continued heating and stirring, there resulted a homogeneous solution, from which crystals suddenly began to separate. After continuing the heating for another four hours, the reaction mixture was left in the refrigerator for sixteen hours. Then the crystals that had separated were recovered by filtration and washed by decantation with 2 one-liter portions of 12A alcohol. After drying by suction, the red-yellow product weighed 346.5 grams. Following crystallization from water (3600 cc. containing decolorizing charcoal which was filtered off) the final yellow product, 2 - oxo - 2,3 - dihydro-4,5- tetramethylene-6-carboxyl-pyrimidine, weighed 117 grams and melted at 189–190° C. It is insoluble in hexane, benzene, methanol, ethanol, and ethyl acetate.

In place of the ethyl 2-ketocyclohexylglyoxalate used in Example 2, the procedure of that example can be similarly carried out with other alkyl esters of any other 2-ketocycloalkylglyoxalate in corresponding molecular proportions to obtain other 2-oxo-2,3-dihydro-4,5-polymethylene-6-carboxyl-pyrimidines, for example, as with ethyl 2-ketocyclopentylglyoxalate, by the use of which there is obtained the corresponding 2-oxo-2,3-dihydro-4,5-trimethylene - 6 - carboxyl - pyrimidines. In this just described example and as also in Example 2, instead of the ethyl radical in the particular glyoxalate, any other corresponding alkyl 2-ketocycloalkylglyoxalate can be used such as the propyl, isopropyl, butyl, isobutyl, amyl, and the like. Actually, it is of no great consequence what the hydrocarbon radical is in the carboxylate group because, as noted from the results in the illustrative Examples 1 and 2, during the condensation the carboxylic acid ester grouping in the 1,3-diketo ester starting material is de-esterified.

While addition of the ethanol in the procedure of Example 1 produced a homogeneous solution, it is not necessary to use the ethanol as the condensation takes place without using a solvent for the ester, as in Example 2. However, when the condensation is carried out with a solvent for the ester, such as ethanol or any other aliphatic alcohol or other solvent for the diketo ester, it is advantageous, for example, in giving a more readily purified end product. Naturally, whatever solvent is selected should be inert to reaction in the reaction solution.

The products of the procedure illustrated in Examples 1 and 2 are dihydro-pyrimidines because they are unsaturated in the pyrimidine ring to the extent of having only two double bonds. Thus, these products exemplify those of type (a) referred to in the initial part of this specification. From these, products of type (b) which are the fully hydrogenated derivatives still having the free carboxyl group in the 6-position are obtained by hydrogenation, advantageously catalytic hydrogenation as with a noble metal catalytic, for example, platinum oxide ($PtO_2$), or a nickel hydrogenation catalyst such as Raney nickel catalyst, as illustrated as follows:

*Example 3.—2 - oxo-4-isopropyl-hexahydro-6-carboxyl-pyrimidine*: 12.5 grams (0.0595 mole) of 2-oxo-4-isopropyl-2,3-dihydro-6 - carboxyl - pyrimidine were suspended in 200 cc. of absolute ethanol in a Parr hydrogenation apparatus and one-half gram of Adams catalyst (platinum oxide, $PtO_2$) was added. The mixture was shaken under hydrogen at an initial pressure of 31.5 pounds at 29–34° C. for five hours, during which time the solid pyrimidine starting material passed into solution which changed in color from yellow to almost colorless. 0.124 mole of hydrogen was absorbed. After applying vacuum to remove hydrogen prior to taking the hydrogenation flask from the shaker, part of the reduction product separated as a white precipitate converting the reaction mixture to a cloudy suspension which was removed from the flask and heated to boiling. Additional absolute ethanol was added to dissolve the precipitate to give a clear solution containing only the catalyst in suspension. The catalyst then was filtered off and the filtrate heated to dissolve the white solid that had separated in the intermediate cooling. Then the clear solution thus obtained was kept in the refrigerator (at 5° C.) for sixteen hours. Thereafter the resulting white precipitate was collected by filtration and dried by suction. The yield was 6.8 grams of 2-oxo-4-isopropyl-hexahydro-6-carboxyl-pyrimidine melting at 205° C., which, after two recrystallizations from 50 per cent ethanol (85 cc. each), was recovered as a white product melting at 214–215° C. (with decomposition).

*Example 4.—2-oxo-4,5-tetramethylene - hexahydro-6-carboxyl-pyrimidine*: (a) 6.4 grams (0.033 mole) of 2-oxo-2,3-dihydro-4,5-tetramethylene-6-carboxyl-pyrimidine were dissolved in 100 cc. of glacial acetic acid in the Parr hydrogenation apparatus and one-half gram of Adams catalyst (platinum oxide, $PtO_2$) was added. The mixture was shaken under hydrogen at an initial pressure of 40 lbs. per sq. inch at 29° C. for sixteen hours, during which time 0.062 mole of hydrogen was absorbed. The reaction mixture was then heated on a steam-bath to dissolve the precipitate that had formed and then the catalyst was filtered off. The filtrate was clarified by the addition of "Norit" decolorizing charcoal and after filtering off the latter, the filtrate was evaporated in a vacuum desiccator over solid potassium hydroxide, leaving crude 2-oxo - 4,5 - tetramethylene - hexahydro - 6 - carboxyl-pyrimidine. This crude product was dissolved in 195 cc. of hot water, decolorized with "Norit" decolorizing charcoal, filtered and then the filtrate allowed to crystallize overnight in the refrigerator. This crop of crystals was similarly dissolved in hot water and allowed to recrystallize, yielding a crop of 3 grams of pure white product melting at 230° C.

(b) While the preceding portion of this example shows the preparation of the product of this example by reduction of the corresponding unsaturated starting material by the use of a platinum oxide catalyst, the reduced product of this example can also be obtained by reduction of the sodium salt of the same unsaturated starting material by the use of Raney nickel catalyst as follows: 5 grams (0.0258 mole) of 2-oxo-2,3-dihydro - 4,5 - tetramethylene-6-carboxyl-pyrimidine were suspended in 40 cc. of water and the mixture made slightly basic by the addition of ten per cent sodium hydroxide, thereby converting the original starting material to its corresponding sodium carboxylate. 4.0 grams of Raney nickel were then added to the yellow solution and the mixture placed in the autoclave under 1600 lbs. per sq. inch pressure of hydrogen at 32° C. The autoclave was rocked at 110–120° C. for six hours, and after cooling, the catalyst was filtered off. The colored filtrate was then acidified to Congo Red with dilute hydrochloric acid and concentrated on a steam-bath to 100 cc. Upon cooling this concentrate, 1.5 grams of glistening white crystals separated. After filtering off these crystals and recrystallizing them three times from water, there was obtained 0.23 gram of 2-oxo-4,5-tetramethylene-hexahydro-6-carboxyl-pyrimidine melting at 230° C. This product of this reduction when melted together with the recrystallized product of the reduction using the platinum oxide catalyst, gave no lowering of the melting point, showing that both hydrogenation products are identical.

While the preceding paragraph describes the reduction, with the use of the Raney nickel catalyst, of the sodium salt of the same unsaturated starting material of the first portion of this Example 4, any other alkali salt, such as the ammonium salt or other alkali metal salt, of the same unsaturated starting material may be used. Such other salt is obtained by following the same procedure as given in the preceding paragraph for the preparation of the sodium salt, but by replacing the sodium hydroxide by the required amount of ammonium hydroxide or by other alkali metal hydroxide, such as potassium hydroxide, and the like, to make the suspension of the 2-oxo-2,3-dihydro-4,5-tetramethylene-6-carboxyl-pyrimidine slightly basic, whereby the original starting compound is converted in the same way to the corresponding alkali carboxylate.

By replacing the 2-oxo-4-isopropyl-2,3-dihydro-6-carboxyl-pyrimidine of Example 3, or the 2-oxo - 2,3 - dihydro - 4,5-tetramethylene-6-carboxyl-pyrimidine of Example 4 by any other similar 2-oxo-2,3-dihydro-6-carboxyl-pyrimidine, such as 2-oxo-2,3-dihydro-4-ethyl-6-carboxyl-pyrimidine, or 2-oxo-2,3-dihydro-n-propyl-6-carboxyl-pyrimidine, or 2-oxo-2,3-dihydro-4-phenyl-6-carboxyl-pyrimidine, or 2-oxo-2,3-dihydro-4-benzyl-6-carboxyl-pyrimidine, there are obtained by hydrogenation in the same way as in the two Examples 3 and 4, the corresponding fully saturated derivatives of the type (b) referred to in the opening portion of this specification, namely: 2-oxo-4-ethyl-hexahydro-6-carboxyl-pyrimidine, or 2-oxo-4-n-propyl-hexahydro-6-carboxyl-pyrimidine, or 2-oxo-4-phenyl-hexahydro-6-carboxyl-pyrimidine, or 2-oxo-4-benzyl-hexahydro - 6 - carboxyl-pyrimidine, and the like.

Then any of the fully saturated compounds of the type (b), as above exemplified, are esterified with the suitably selected alcohol to convert the 6-carboxyl group to the corresponding 6-carboxylate group containing the desired ester radical from the selected alcohol used in the esterification, which is shown in the following embodiments:

*Example 5.—Ethyl 2-oxo-4,5-tetramethylene-hexahydropyrimidine-6-carboxylate*: To 500 cc. of absolute alcohol there were added, while cooling in a round bottom flask, 20 grams of hydrogen chloride gas and then 20 grams of 2-oxo-4,5-tetramethylene-hexahydro - 6 - carboxy - pyrimidine and the mixture was refluxed for an hour and twenty minutes. The alcohol was distilled off until about 30 cc. of solution remained and the concentrate thus obtained was kept in the refrigerator (at between —5° and 0° C.) for several days. The solid which separated out was then filtered off and the filtrate evaporated to dryness at room temperature in a current of air and the resulting solid residue was added to the original solid that had been separated from that filtrate before its evaporation. The total yield of 16 grams of solid, melting at 210–213° C., was triturated with luke warm water, made basic by addition of five per cent sodium bicarbonate solution, cooled and filtered. The crystals which were filtered off were washed with a little water and then recrystallized from water, yielding 10 grams of product melting at 210–214° C. Following two further recrystallizations from absolute alcohol, there were obtained 5 grams of pure white ethyl 2-oxo-4,5-tetramethylene-hexahydro-6-pyrimidine carboxylate, melting at 212–214° C., insoluble in alkali and quite soluble in alcohol.

*Example 6.—Ethyl 2-oxo-4-isopropyl-hexahydropyrimidine-6-carboxylate*: 20 grams of hydrogen chloride gas were dissolved in 500 cc. of absolute ethanol in a round bottom flask and 16 grams of 2-oxo-4-isopropyl-hexahydropyrimidine-6-carboxylic acid were added and the mixture boiled for two hours. The alcohol was then distilled off and upon the addition of ether to the oily residue, a white powder was precipitated. The mixture was then filtered and the solid residue, dried by suction, amounted to 17 grams, melting at 120–128° C. This solid residue was then suspended in water and a layer of ether added and the mixture gradually made basic with ten per cent sodium bicarbonate solution, the mixture being shaken between additions of the sodium bicarbonate. The water layer was then separated and discarded and the ether solution dried with anhydrous sodium sulphate. After evaporating off the ether under vacuum at 60° C., there remained as a white powder the ethyl 2-oxo-4-isopropyl-hexahydropyrimidine-6-carboxylate melting at 139-140° C., which crystallized from benzene-hexane as small needles melting at 140-141° C.

The various products of the invention are useful as intermediates for the preparation of other organic compounds, for example, alpha, gamma-diamino carboxylic acids.

While the invention has been illustrated by certain specific embodiments of it, it is understood that various alterations or substitutions may be made in it within the scope of the appending claims.

What is claimed is:

1. A 2-oxo-4-$R_1$-5-$R_2$-6-COOR-pyrimidine, in which the pyrimidine ring is at least partially hydrogenated and is a member of the class consisting of (a) the 2,3-dihydro-pyrimidine, and (b) the fully saturated hexahydro-pyrimidine; and wherein R is a member of the class consisting of hydrogen, a lower alkyl radical, an alkali metal and an ammonium group; $R_1$ is a member of the class consisting of a lower alkyl radical, phenyl and benzyl radicals, $R_2$ is hydrogen, and $R_1$ and $R_2$ jointly constitute a divalent polymethylene radical.

2. 2 - oxo - 4 - isopropyl - 2,3 - dihydro - 6 - carboxyl-pyrimidine.

3. 2 - oxo - 2,3 - dihydro - 4,5 - tetramethylene-6-carboxyl-pyrimidine.

4. 2 - oxo - 4 - isopropyl - hexahydro - 6 - carboxyl-pyrimidine.

5. 2 - oxo - 4,5 - tetramethylene - hexahydro-6-carboxyl-pyrimidine.

6. Ethyl 2 - oxo - 4,5 - tetramethylene-hexahydropyrimidine-6-carboxylate.

7. The method of preparing a 2-oxo-4-$R_1$-5-$R_2$-6-COOR-pyrimidine which comprises condensing urea under acid conditions, by the use of a mineral acid, with a compound of the general formula:

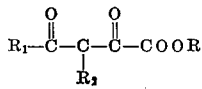

to form a 2-oxo-2,3-dihydro-4-$R_1$-5-$R_2$-6-carboxyl-pyrimidine, and reducing the latter compound with hydrogen under hydrogenation conditions and until sufficient hydrogen has been absorbed to saturate the pyrimidine ring to the corresponding hexahydro-pyrimidine, and then esterifying said hexahydro-pyrimidine under acid conditions, by the use of a mineral acid, with the selected alcohol to introduce the desired ester group in forming the corresponding 2-oxo-4-$R_1$-5-$R_2$-6-carboxylate-pyrimidine wherein R is a member of the class consisting of hydrogen, a lower alkyl radical, an alkali metal and an ammonium group; $R_1$ is a member of the class consisting of a lower alkyl radical, phenyl and benzyl radicals, $R_2$ is hydrogen, and $R_1$ and $R_2$ jointly constitute a divalent polymethylene radical, and R is an alkyl radical.

8. The method of preparing a 2-oxo-4-$R_1$-5-$R_2$-6-COOR-pyrimidine which comprises condensing urea under acid conditions, by the use of a mineral acid, with a compound of the general formula:

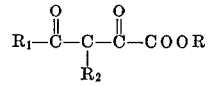

to form a 2-oxo-2,3-dihydro-4-$R_1$-5-$R_2$-6-carboxyl-pyrimidine, and reducing the latter compound with hydrogen under hydrogenation conditions and until sufficient hydrogen has been absorbed to saturate the pyrimidine ring to the corresponding hexahydro-pyrimidine, wherein R is a member of the class consisting of hydrogen, a lower alkyl radical, an alkali metal and an ammonium group; $R_1$ is a member of the class consisting of a lower alkyl radical, phenyl and benzyl radicals, $R_2$ is hydrogen, and $R_1$ and $R_2$ jointly constitute a divalent polymethylene radical, and R is an alkyl radical.

9. The method of preparing a 2-oxo-4-$R_1$-5-$R_2$-6-COOR-pyrimidine which comprises condensing urea under acid conditions, by the use of a mineral acid, with a compound of the general formula:

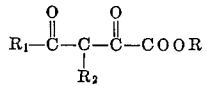

to form a 2-oxo-2,3-dihydro-4-$R_1$-5-$R_2$-6-carboxyl-pyrimidine, wherein R is a member of the class consisting of hydrogen, a lower alkyl radical, an alkali metal and an ammonium group; $R_1$ is a member of the class consisting of a lower alkyl radical, phenyl and benzyl radicals, $R_2$ is hydrogen, and $R_1$ and $R_2$ jointly constitute a divalent polymethylene radical, and R is an alkyl radical.

JAMES M. SPRAGUE.
EVERETT M. SCHULTZ.

References Cited in the file of this patent
Wright et al., Proc. Soc. Exptl. Biol. Med., 64 (1947) 150/3.